United States Patent
Denkewicz, Jr. et al.

(10) Patent No.: US 8,066,940 B2
(45) Date of Patent: *Nov. 29, 2011

(54) APPARATUS AND METHOD FOR REMOVING ARSENIC AND INORGANIC COMPOSITIONS FROM WATER

(75) Inventors: Raymond P. Denkewicz, Jr., East Greenwich, RI (US); Rolf Engelhard, Prescott, AZ (US)

(73) Assignee: Zuvo Water, LLC, Mountain View, CA (US)

( * ) Notice: Subject to any disclaimer, the term of this patent is extended or adjusted under 35 U.S.C. 154(b) by 1185 days.

This patent is subject to a terminal disclaimer.

(21) Appl. No.: 11/770,504

(22) Filed: Jun. 28, 2007
(Under 37 CFR 1.47)

(65) Prior Publication Data
US 2008/0302735 A1 Dec. 11, 2008

Related U.S. Application Data

(60) Provisional application No. 60/806,320, filed on Jun. 30, 2006.

(51) Int. Cl.
*C02F 1/32* (2006.01)
(52) U.S. Cl. ....... 422/24; 422/20; 422/186; 210/748.01; 210/748.12
(58) Field of Classification Search .. 210/748.01–748.1, 210/760, 192, 758, 784.12; 422/22, 24, 186.3, 422/186
See application file for complete search history.

(56) References Cited

U.S. PATENT DOCUMENTS

| | | | |
|---|---|---|---|
| 2,970,821 A | 2/1961 | Axt | 261/16 |
| 3,336,099 A | 8/1967 | Czulak et al. | 21/102 |
| 3,550,782 A | 12/1970 | Veloz | 210/192 |
| 3,696,932 A | 10/1972 | Rosenberg | 210/437 |
| 3,726,404 A | 4/1973 | Troglione | 210/139 |
| 3,740,320 A * | 6/1973 | Arthur | 435/39 |
| 4,069,153 A | 1/1978 | Gunther | 210/64 |
| 4,141,830 A | 2/1979 | Last | 210/63 Z |
| 4,176,061 A | 11/1979 | Stopka | 210/63 Z |
| 4,179,616 A | 12/1979 | Coviello et al. | 250/527 |
| 4,207,180 A * | 6/1980 | Chang | 210/612 |
| 4,230,571 A | 10/1980 | Dadd | 3/8 |
| 4,273,660 A | 6/1981 | Beitzel | 210/760 |
| 4,274,970 A | 6/1981 | Beitzel | 210/748 |

(Continued)

FOREIGN PATENT DOCUMENTS
DE 3828026 A1 2/1990
(Continued)

OTHER PUBLICATIONS

Article entitled, "Fountainhead Technologies Talks About Their Unique Approach to Catalytic Water Purification", The Catalyst Review, Nov. 1994, pp. 1, 7-9.

(Continued)

*Primary Examiner* — Walter Griffin
*Assistant Examiner* — Cameron J Allen
(74) *Attorney, Agent, or Firm* — Mark J. Danielson; Pillsbury Winthrop Shaw Pittman LLP

(57) ABSTRACT

Simultaneous application of ozone and ultraviolet light (UV185 and UV254) in water to be purified will create hydroxyl radicals, which combination will cause conversion of AS (III) that may be present to As (V), oxidation of inorganic matter such as manganese, sulfur, phosphorus and organic matter and provide virucidal and germicidal effects to purify the water.

42 Claims, 3 Drawing Sheets

U.S. PATENT DOCUMENTS

| | | | |
|---|---|---|---|
| 4,323,810 A | 4/1982 | Horstmann | 313/24 |
| 4,422,450 A | 12/1983 | Rusteberg | 128/62 A |
| 4,437,999 A | 3/1984 | Mayne | 210/748 |
| 4,694,179 A | 9/1987 | Lew et al. | 250/431 |
| 4,752,401 A | 6/1988 | Bodenstein | 210/746 |
| 4,857,204 A | 8/1989 | Joklik | 210/695 |
| 4,892,712 A | 1/1990 | Robertson et al. | 422/186 |
| 4,913,827 A | 4/1990 | Nebel | 210/748 |
| 4,968,437 A | 11/1990 | Noll et al. | 210/748 |
| 5,043,079 A | 8/1991 | Hallett | 1/32 |
| 5,082,558 A | 1/1992 | Burris | 210/167 |
| 5,106,495 A | 4/1992 | Hughes | 210/139 |
| 5,106,501 A | 4/1992 | Yang et al. | 210/266 |
| 5,120,450 A | 6/1992 | Stanley, Jr. | 210/748 |
| 5,141,636 A | 8/1992 | Flanagan et al. | 210/209 |
| 5,158,454 A | 10/1992 | Viebahn et al. | 433/82 |
| 5,178,755 A | 1/1993 | LaCrosse | 210/195 |
| 5,178,758 A | 1/1993 | Hwang | 210/256 |
| 5,180,499 A | 1/1993 | Hinson et al. | 210/706 |
| 5,207,993 A | 5/1993 | Burris | 422/256 |
| 5,213,773 A | 5/1993 | Burris | 422/256 |
| 5,230,792 A | 7/1993 | Sauska | 1/32 |
| 5,266,215 A | 11/1993 | Engelhard | 210/748 |
| 5,268,104 A | 12/1993 | Masoomain | 210/638 |
| 5,302,298 A | 4/1994 | Leitzke | 210/748 |
| 5,352,369 A | 10/1994 | Heinig, Jr. | 210/760 |
| 5,431,861 A | 7/1995 | Nagahiro et al. | 261/140.1 |
| 5,520,893 A | 5/1996 | Kasting, Jr. et al. | 422/305 |
| 5,540,848 A | 7/1996 | Engelhard | 210/748 |
| 5,547,590 A | 8/1996 | Szabo | 210/748 |
| 5,709,799 A | 1/1998 | Engelhard | 210/748 |
| 5,753,106 A * | 5/1998 | Schenck | 210/96.1 |
| 5,935,431 A | 8/1999 | Korin | 210/205 |
| 5,942,125 A | 8/1999 | Engelhard et al. | 210/748 |
| 6,267,895 B1 | 7/2001 | Engelhard et al. | 210/748 |
| 6,461,520 B1 | 10/2002 | Engelhard et al. | 210/748 |
| 6,491,879 B2 | 12/2002 | Conrad | 422/186.18 |
| 6,511,594 B2 | 1/2003 | Shaw | 210/120 |
| 6,511,638 B2 | 1/2003 | Matsuzaki | 422/186.18 |
| 7,794,608 B2 * | 9/2010 | Denkewicz et al. | 210/760 |
| 2008/0302737 A1 * | 12/2008 | Denkewicz et al. | 210/760 |

FOREIGN PATENT DOCUMENTS

| | | | |
|---|---|---|---|
| EP | 0 235 315 | 2/1986 | |
| EP | 0 237 793 | 2/1987 | |
| EP | 0 227 266 | 7/1987 | |
| EP | 0 316 687 | 5/1989 | |
| JP | 3-143586 A | 6/1991 | |
| JP | 4-141296 A | 5/1992 | |
| WO | PCT/US94/3689 | 11/1994 | 1/32 |
| WO | PCT/US99/13591 | 12/1999 | 2/8 |
| WO | PCT/US00/13839 | 11/2000 | 35/6 |

OTHER PUBLICATIONS

US 5,159,606, 12/1992, Batchelor (withdrawn).

* cited by examiner

APPARATUS AND METHOD FOR REMOVING ARSENIC AND INORGANIC COMPOSITIONS FROM WATER

CROSS REFERENCE TO RELATED APPLICATIONS

The present application is related to and claims priority from a provisional patent application entitled "Apparatus and Method for Removing Arsenic and Inorganic Compositions from Water" filed Jun. 30, 2006 assigned Ser. No. 60/806,320.

BACKGROUND OF THE INVENTION

1. Field of the Invention

The present invention relates to the removal of arsenic, iron, phosphorus, sulfur, manganese and other dissolved minerals, whether naturally occurring or byproducts of commercial activities and, more particularly, to conversion of arsenic to arsenate and oxidation of other organic and inorganic matter.

2. Description of Related Prior Art

Arsenic occurs naturally in the environment as a heavy metal in two different forms, arsenite [As (III)] and arsenate [As (V)]. Arsenic is released into water supplies from erosion of rocks and soil. The distribution of arsenic in soil, ground water and surface water has extensively been investigated during the past two decades.

Long term exposure is proven to result in health effects, such as cancer, cardiovascular disease, diabetes and reproductive problems. Nationally, about three thousand or 5.5% of the nation's 54,000 community water systems and 1,100 (or 5.5%) of the twenty thousand non-transient non-community water systems will need to take measures to lower arsenic in their drinking water. Of the affected systems, 97% serve fewer than 10,000 people. While high concentrations of arsenic are found mostly in the western region of the United States, parts of the mid-west and New England show levels of arsenic that exceed the newly approved U.S. Environmental Protection Agency (EPA) standard of ten (10) parts per billion (ppb). The western states have more systems greater than ten (10) ppb as compared to the national average. Some systems and part of the mid-west and New England have current arsenic levels that are greater than ten (10) ppb but most systems have arsenic levels that range from two (2) to ten (10) ppb of arsenic.

Jan. 23, 2006 was the EPA drinking water compliance deadline for the Revised Arsenic Standard to ten (10) ppb Maximum Contaminant Limit (MCL). The revised standard was issued in light of the myriad of both the short term and long term health effects of ingested arsenic in drinking water. Short or acute effects can occur within hours or days of exposure. Long or chronic effects occur over many years. Long term exposure to arsenic has been linked to cancer of the bladder, lungs, skin, kidneys, nasal passages, liver and prostate. Short term exposure to high doses of arsenic can cause other adverse health effects, but such effects are unlikely to occur from U.S. public water supplies that are in compliance with the arsenic standard.

A variety of technologies have been developed for arsenic removal. All of the technologies rely on a few basic chemical processes. These include:

1. Oxidation/reduction reactions that reduce (add electrons to) or oxidize (remove electrons from) chemicals and altering their chemical form. These reactions do not remove arsenic from solution but are often used to convert the trivalent form of arsenic (As III) to the pentavalent form (As V). The latter form is much less toxic and is more readily removed via precipitation, ion exchange and adsorption than is the former.

2. Precipitation: causing dissolved arsenic to form a low solubility solid mineral, such as calcium arsenate. This solid can then be removed through sedimentation and filtration. When coagulants are added and form flocculants, other dissolved compounds such as arsenic can become insoluble and form solids which is known as co-precipitation. The solids formed may remain suspended and require removal through solid/liquid separation processes, typically coagulation and filtration.

3. Adsorption and ion exchange: various solid materials, including iron, titanium and aluminum hydroxide flocculants, have a strong affinity for dissolved arsenic. Arsenic is strongly attracted to sorption sites on the surfaces of these solids and is effectively removed from solution. Ion exchange can be considered as a special form of adsorption, though it is often considered separately. Ion exchange involves a reversible displacement of an ion adsorbed into a solid surface by a dissolved ion. Other forms of adsorption involve stronger bonds and are less easily reversed.

4. Solid/liquid separation: precipitation, co-precipitation, adsorption and ion exchange all transfer the contaminant from the dissolved to a solid phase. In some cases the solid is large and fixed (e.g. grains of ion exchange resin) and no solid/liquid separation is required. If the solids are formed in situ (through precipitation or coagulation), they must be separated from the water. Gravity settling (also called sedimentation) can accomplish some of this but filtration is more effective. More commonly, sand filters are used for this purpose.

5. Physical exclusion: some synthetic membranes are permeable to certain dissolved compounds but exclude others. These membranes can act as a molecular filter to remove dissolved arsenic, along with many other dissolved and particulate compounds.

6. Biological removal processes: bacteria can play an important role in catalyzing many of the above processes. Relatively little is known about the potential for biological removal of arsenic from water. While all of these techniques have merit, some of the most effective approaches involve oxidation. In March 2001, Ganesh Ghurye and Dennis Clifford of the University of Houston studied seven different oxidants for the removal of arsenic in an EPA sponsored study (Contract No. 8C-R311-NAEX) entitled "Laboratory Study on the Oxidation of Arsenic III to Arsenic V".

Their conclusions were:

Free chlorine: dissolved manganese, dissolved iron, sulfide, and Total Organic Carbon (TOC) slowed the rate of oxidation slightly but essentially complete oxidation of arsenite As (III) to arsonate As (V) was obtained in less than one minute.

Chloramines: preformed monochloramine was ineffective for As (III) oxidation.

Chlorine dioxide: only limited oxidation was achieved with chlorine dioxide.

Permanganate: dissolved manganese, dissolved iron, sulfide and TOC slowed the rate of oxidation slightly but essentially complete oxidation of As (III) to As (V) was obtained in less than one minute.

Ultraviolet (UV) radiation: UV (254 nm) was not very effective.

Oxidizing media: manganese dioxide media showed effectiveness when dissolved oxygen levels were not limiting. Interfering reductants led to incomplete oxidation.

Ozone: in the absence of interfering reductants, such as sulfide and TOC, ozone rapidly oxidized As (III). TOC had a quenching effect at higher TOC levels but the presence of sulfide considerably slowed the oxidation of As (III).

Ghurye and Clifford reported that ozone performed the best provided that sulfides and organic matter were not present in the water as these compounds created an ozone demand that interfered with the ability of ozone to convert the As (III) to As (V). Ozone is much preferred over chlorine and permanganate if the objective is to reduce chemical use.

SUMMARY OF THE INVENTION

The present invention relates to the discovery that simultaneous application of ultraviolet light (UV) and ozone (with optional addition of hydrogen peroxide) during treatment of water containing arsenic will effectively convert As (III) to As (V) even in the presence of sulfides and organic matter. This result was unexpected as UV radiation is ineffective to convert As (III) to As (V) and as independent studies indicate that in the presence of sulfides and organic matter the oxidizing ability of ozone is suppressed. It is believed that the formation of hydroxyl radicals resulting from the interaction of UV and ozone may be less discriminating and less affected by the presence of other impurities such as sulfides and organic matter and thereby accomplish the conversion of As (III) to As (V). Moreover, the dual use of UV and ozone that produce hydroxyl radicals that bring about oxidation of other inorganic matter, such as manganese, sulfur, phosphorus and organic matter.

It is therefore a primary object of the present invention to convert As (III) to As (V) in water by application of ultraviolet light and ozone.

Another object of the present invention is to purify water by eliminating arsenite (As III) from the water.

Still another object of the present invention is to provide apparatus for producing hydroxyl radicals to oxidize certain inorganic and organic matters.

Yet another object of the present invention is to provide a relatively inexpensive apparatus for converting As (III) to As (V).

A further object of the present invention is to produce hydroxyl radicals by application of ozone and UV to water being purified to completely or nearly completely mineralize organic contaminants to carbon dioxide, oxygen, water and a small amount of mineral acids or salts.

A yet further object of the present invention is to simultaneously produce ozone and ultraviolet radiation for converting As (III) to As (V).

A yet further object of the present invention is to introduce hydrogen peroxide into water being purified by application of ultraviolet light, entrainment of ozone to produce hydroxyl radicals to assist in converting As (III) that may be present to As (V).

A still further object of the present invention is to provide a method for oxidizing arsenic, various inorganic compounds and organic compounds in drinking water by simultaneously subjecting the water to ozone and ultraviolet radiation.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
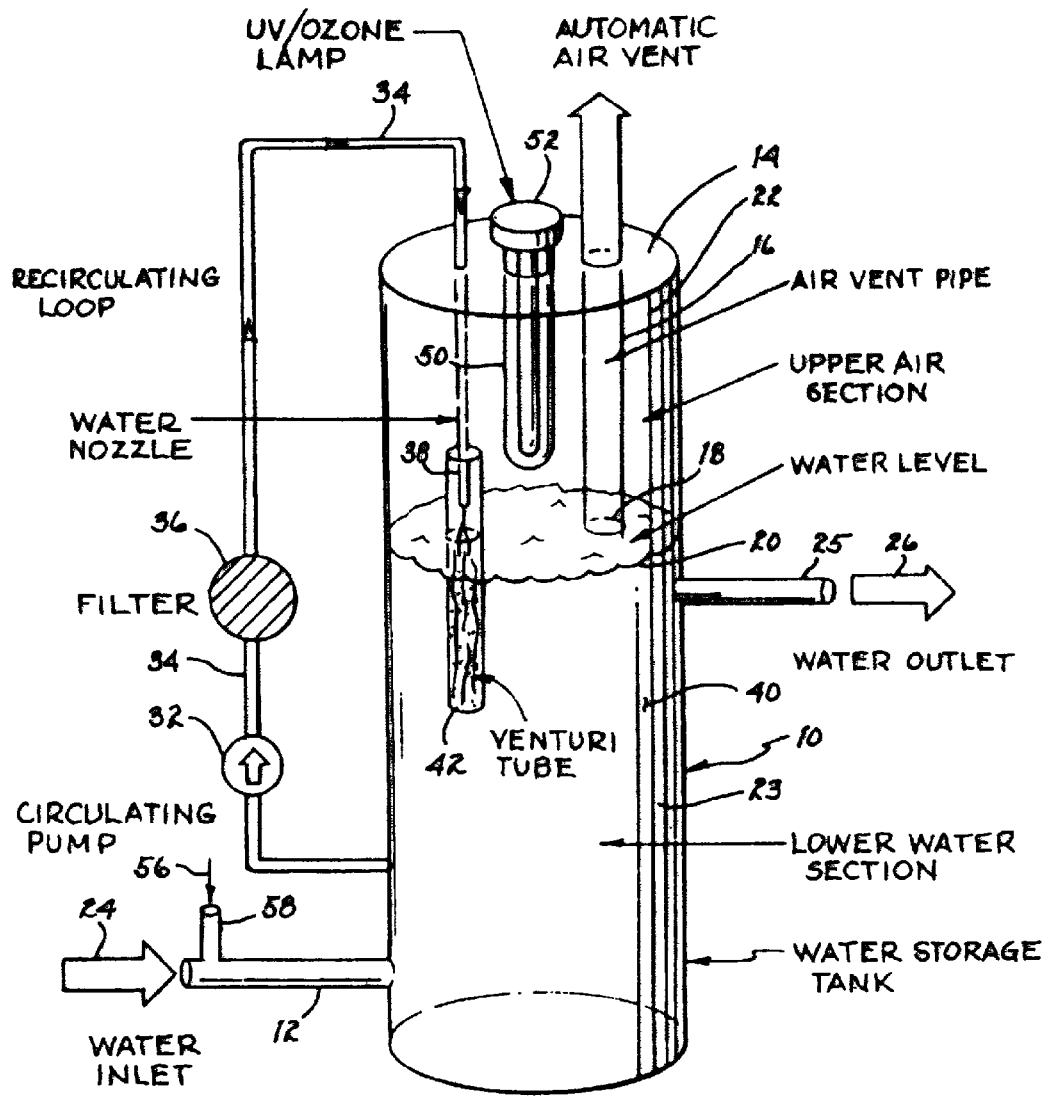
FIG. 1 illustrates apparatus for simultaneously applying ozone and ultraviolet radiation to water to be purified by oxidation of various inorganic and organic compounds.

Referring to FIG. 1, there is illustrated a water storage tank 10 having an inlet conduit 12 for supplying water into the tank under pressure. Top 14 of tank 10 is closed and a conduit 16 extends from the top into the tank to locate outlet 18 some distance from the top of the tank. This conduit serves in the manner of a vent. That is, as water enters the tank through inlet conduit 12, water level 20 will rise unimpeded until it reaches outlet 18. At that point, head space 22, defining an upper air section, is essentially at ambient pressure. The pressure of the water in lower water section 23 will increase to a pressure essentially equivalent that of the inflowing water, represented by arrow 24 and water level 20 will rise until the air pressure within the head space is essentially equivalent the water pressure in the lower water section. Outlet water conduit 25 provides a flow of water represented by arrow 26, on demand by operation of a valve downstream. As the water flows out of tank 10, it will be replenished by water flowing through inlet conduit 12 and water level 20 will remain essentially constant. Water tanks constructed and operated in the manner discussed above are provided by various commercial entities for residential and commercial use.

A conduit 30 is in fluid communication with the water in lower water section 23. Water is withdrawn from tank 10 by a pump 32 in fluid communication with conduit 30 and will cause a flow of water through conduit 34. A filter 36 may be incorporated in conduit 34 to perform a filtration function. Conduit 34 extends into tank 10 and is terminated by a nozzle 38. The water discharged through the nozzle is directed downwardly into water 40 in tank 10 and will strike the water with some force. The passage of water through the air, as well as its impact on the water at water level 20 will cause the air from head space 22 to become entrained in the stream of water from nozzle 38 and in water 40. To enhance entrainment of the air, a tube 42, that may be functionally described as a venturi tube, is located above and below water level 20 to receive the water ejected from nozzle 38. This tube serves in the manner of a venturi and will augment entrainment of the air into the stream of water and into water 40 in the tank. Additionally, tube 42 will convey air entrained water into water 40 to a point below water level 20. As a result of the entrained air, the air will have an oxidizing effect upon organic matter in the water and cause a level of destruction of the organic matter. Thereby, the entrained air will perform a purifying function on water within tank 10.

An ultraviolet lamp (UV lamp) 50 extends into head space 22 defining the upper air section of tank 10. A mounting 52, including electrical connections for the UV lamp, is representatively shown and is supported at the top 14. Preferably, the UV lamp will emit radiation in wavelengths including at least 185 nanometers (nm) and generally identified as UV185. Radiation at this frequency will cause oxygen molecules within the air in head space 22 to be converted to ozone molecules. Because the air is under pressure, the production of ozone molecules will be enhanced over that occurring at ambient pressure. These ozone molecules will permeate the head space. As a result of the stream of water flowing from nozzle 38, the air, now including ozone molecules, will become entrained within water 40. The presence of the ozone molecules in the water will have a tendency to oxidize any organic matter coming in contact therewith. Thereby, the ozone produced and entrained in the water will have the beneficial effect of purifying the water in tank 10.

Additionally, UV lamp 50 includes radiation at a wavelength of about 254 nm, often referred to as UV254. Radiation at this frequency has a germicidal and virucidal effect and will disinfect the water at the water level and the water beneath the surface of the water to the extent of penetration of the radiation. Thereby, UV lamp 50 has a further benefit of purifying and maintaining pure the water in tank 10. Moreover, water 40 will be caused to circulate within lower section 23 of tank 10 as a result of the downward flow of water from nozzle 38. This flow will help stir the water and thereby cause all of the water to become subjected to the purifying effects of ozone entrainment and UV irradiation.

As discussed above, arsenic is present in water in many regions. At some such locations, it exceeds a mandated maximum of 10 parts per billion (ppb). As set forth above, UV radiation of water containing arsenic is ineffective to convert As (III) to As (V). Moreover, the presence of sulfides and organic matter in the water has the effect of suppressing the oxidizing effect of ozone. Nevertheless, it has been discovered that the combined effect of UV radiation and the presence of ozone in water is, in fact, effective to convert As (III) to As (V). It has further been learned that with the addition of hydrogen peroxide into the water, the presence of UV radiation and ozone results in the formation of hydroxyl radicals. Unlike hydroxyl radicals, ozone is a fairly selective oxidant. Studies indicate that the second order rate constants of ozone with organic matter varies by several orders of magnitude. Hydroxyl radicals may be less discriminating and less affected by the presence of other impurities, such as sulfides and organic matter; thereby, conversion of As (III) to As (V) can be enhanced.

The dual use of ultraviolet light (UV) and ozone has other advantages in addition to arsenic oxidation. Iron, manganese, sulfur, phosphorus and organic manner are all readily oxidized by the potent hydroxyl radicals. Again, because it is believed that hydroxyl radicals may be less discriminatory than ozone in their oxidative nature, all oxidizable compounds that may be present are believed to be affected. Moreover, the combination of application of ultraviolet light and entrainment of ozone in the water has the effect of disinfecting the water from microbial contaminants, such as bacteria, viruses and protozoan cysts. For example, studies indicate that the synergistic effect of ultraviolet radiation and ozone is effective in destroying *E. Coli*.

A further benefit arising from the present discovery is that the presence of hydroxyl radicals can completely, or nearly completely, mineralize organic contaminants to carbon dioxide, oxygen, water and a small amount of mineral acids or salts. For example, hydroxyl radicals can destroy phenols, methylene chloride, MTBE, BTEX, acetones, ketones, cyanides, acrylonitriles, propellants, pesticides, solvents, plasticizers, chelants, petroleum hydrocarbons, amino acids, chemical warfare agents (e.g. Sarin, Tabun, VX, GF, GX, cyanide, Soman, mustard gas), biological warfare agents (e.g. anthrax), energetic compounds (e.g. TNT, RDX), pharmaceutical compounds (e.g. endocrine disruptors, estrogen, antibiotics) and BOD, COD (biological oxygen demand/chemical oxygen demand) contributing compounds.

It has been learned that hydroxyl radicals are formed when UV light (UV254) interacts with ozone. The ozone may be generated either by conventional corona discharge methods or from UV lamps emitting a wavelength of about 185 nm (UV185). Hydroxyl radicals can also be formed when hydrogen peroxide is added to water which is then exposed to UV light. Moreover, UV light interacting with solutions containing both entrained ozone and hydrogen peroxide can form hydroxyl radicals.

To reiterate and in reference to FIG. 1, UV lamp 50 extends into head space 22. By selecting the UV lamp to emit a wavelength of at least 185 nm (UV185) then oxygen molecules within the head space will be converted into ozone molecules. These ozone molecules will become entrained with the water discharged through nozzle 85 and directed into tube 42. Thus, water 40 within lower water section 23 will become entrained with ozone. If UV lamp 50 is selected to also radiate ultraviolet light at a wavelength of about 254 nm (UV254) then this emitted UV radiation will disinfect the water to the extent that the radiation penetrates the surface of the water. As discussed above, the combination of UV radiation and ozone will have the effect of creating hydroxyl radicals resulting in the benefits discussed above. To enhance the creation of hydroxyl radicals, hydrogen peroxide, as represented by arrow 56 can be injected into inlet conduit 12 through conduit 58 to mix with the inflowing water, represented by arrow 24.

Figure 2:
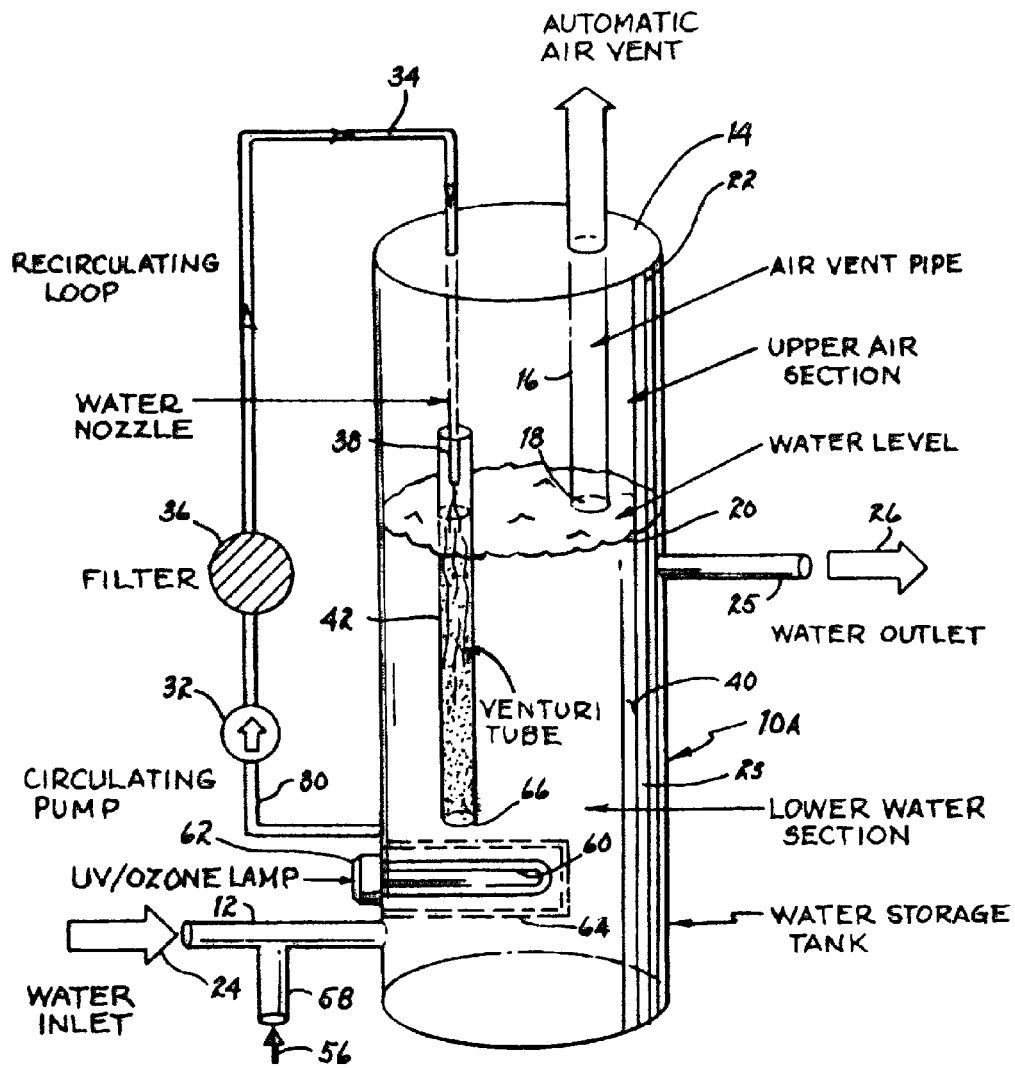
FIG. 2 illustrates a variant of the apparatus shown in FIG. 1 to increase the irradiation of water to be purified with ultraviolet radiation.

Referring to FIG. 2, there is shown a variant tank 10A of tank 10 shown in FIG. 1. The following discussion will relate to and primarily describe the differences in components, their locations and their functions. UV lamp 60 is mounted in water tank 10A in the water beneath water level 20 by a mounting 62, which mounting includes mechanical and electrical connections for the UV lamp. Optionally, a shroud 64 of UV transparent material, such as quartz, may be employed to protect the UV lamp without affecting its irradiating capabilities. Tube 42, serving in the manner of a venturi, includes a discharge end 66 proximate UV lamp 60. Thereby, the air molecules entrained in the water flowing downwardly through tube 42 are brought into close proximity with the UV lamp to urge conversion of some of the oxygen molecules into ozone molecules. To urge such conversion, the wavelength of the UV lamp should be about 185 nm (UV185). To provide a disinfecting effect of the ultraviolet light radiated from the UV lamp, it should radiate ultraviolet light with a wavelength of about 254 nm (UV254).

To further enhance the production of ozone molecules from the oxygen molecules entrained in the air flowing through tube 42, the UV lamp may be mounted in a vertical orientation (as opposed to the horizontal orientation illustrated in FIG. 2). By locating discharge end 66 of tube 42 at the base of the upwardly extending UV lamp, the entrained air bubbles containing oxygen molecules will tend to travel upwardly along the UV lamp and thereby increase the exposure time to UV185. With such configuration of the ozone lamp and the discharge end 66 of tube 42, ozone production will be significantly enhanced. It may be noted that with introduction of hydrogen peroxide represented by 56 through conduit 58 into the water flowing into tank 10 proximate the location of UV lamp 60, formation of hydroxyl radicals can be enhanced.

Aside from reorienting the UV lamp to a vertical position, a further UV lamp may be mounted in head space 22, as illustrated in and discussed with respect to FIG. 1. Thereby, ozone molecules will be formed in the head space and some of which will be entrained in the water by the water discharged from nozzle 38 of conduit 34.

Figure 3:
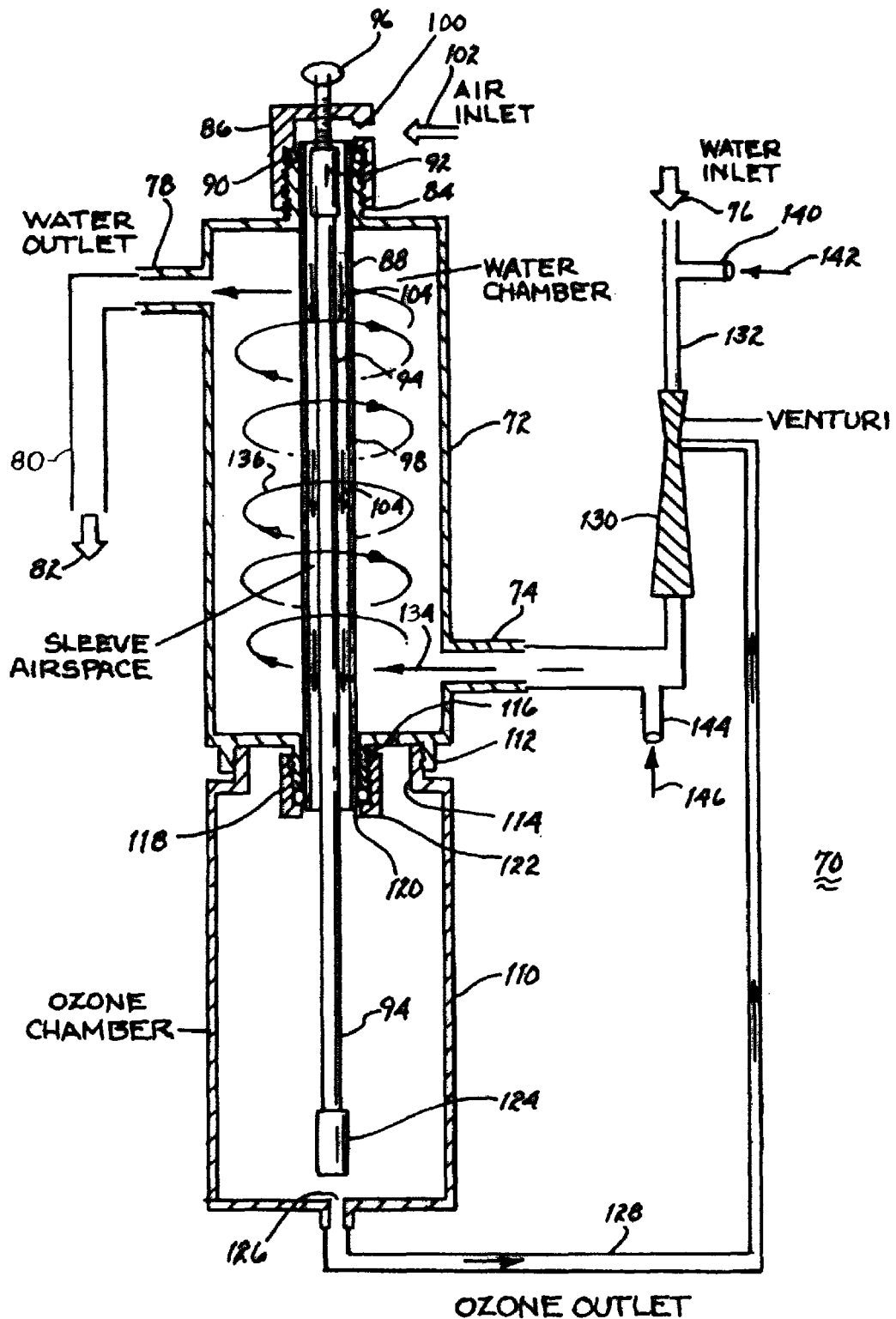
FIGS. 3 illustrates apparatus for enhancing the production of ozone for entrainment in and simultaneous irradiation of water to be purified.

Referring to FIG. 3, there is illustrated a yet further variant 70 for enhancing the production of ozone. While retaining the benefits of irradiation with UV185, UV254, ozone production and the formation of hydroxyl radicals will be enhanced by the structure variant 70. The variant includes a water tank 72 having an inlet 74 for receiving water, represented by arrow 76. The water treated within tank 72 is discharged through outlet 78 and conduit 80 to a point of use, as represented by arrow 82. A hollow threaded boss 84 extends from tank 72 for threaded engagement with a cap 86. A sleeve 88, which is preferably made of quartz or other material transmissive to ultraviolet light is attached to boss 84 and extends downwardly into tank 72. An O-ring 90 is disposed intermediate cap 86, boss 84 and sleeve 88 to provide a water tight seal upon attachment of the cap. A mounting 92 is disposed at or proximate the upper end of sleeve 88 and supports a UV lamp 94 extending downwardly through sleeve 88. Electrical connectors 96 extend through cap 86 for providing electrical power to the UV lamp. An annular space 98 exists between UV lamp 94 and the interior surface of sleeve 88. An air inlet 100 is disposed in cap 86 for receiving a flow of an oxygen molecule containing gas, such as air, representatively identified by arrow 102. As depicted by arrows 104, the gas entering through inlet 100 flows downwardly through annular space 98 intermediate UV lamp 94 and sleeve 88.

An air chamber 110 is attached to tank 72 by a threaded boss 112 extending from the tank and threadedly engages threaded neck 114 extending from the chamber. A threaded boss 116 extends from tank 72 for threaded engagement with a cap 118 having an opening 120 for accommodating passage therethrough of UV lamp 94. The lower end of sleeve 88 is secured by boss 116, cap 118 and an O-ring 122 to secure the lower end of the sleeve and to prevent water leakage.

As illustrated, the lower end of the UV lamp extends into chamber 110. It may include a mounting 124 suitably attached to the chamber to provide support for the end of the UV lamp, if necessary. An outlet 126 is disposed in the chamber and interconnected with a conduit 128. The conduit is in fluid communication with venturi 130. As illustrated, the venturi is disposed in conduit 132 for transport of water to inlet 74 of tank 72. The venturi includes a restricted passage therein, as is normal, and the outlet of conduit 128 is in fluid communication with the restricted passage. Within this restricted passageway, there is a low pressure environment. This low pressure environment will tend to draw gases present within conduit 128 and cause entrainment of such gases with the water flowing through the venturi. Accordingly, the water entering tank 72, as represented by arrow 134, will be water entrained with gas.

In operation, water flows into tank 72 and preferably flows within the tank in a swirling motion, as represented by arrows 136, about sleeve 104. Such movement of the water about the sleeve will enhance irradiation of the water with ultraviolet light from UV lamp 94. Simultaneously, air enters cap 86 through inlet 100 and flows downwardly past UV lamp 94 through annular space 98. The UV lamp radiates ultraviolet light having a wavelength of 185 nm (UV185). It is well known that ultraviolet with this wavelength and irradiating oxygen molecules will convert some of the oxygen molecules into ozone molecules. As a result, the gas flowing through annular space 98 will become ozone enriched. The degree of ozone formation is a function of the time of exposure of the oxygen molecule containing gas to UV185. Since the gas is flowing through the annular space, the rapidity of flow is an inverse function on the exposure time to UV185.

The ozone enriched oxygen bearing gas is exhausted from annular space 98 into chamber 110. The dimensions of the chamber are significantly greater than those of annular space 98. Accordingly, the rate of flow of the oxygen containing gas through the chamber is much slower than the flow rate through the annular space. Thus, the time of exposure of the gas to the portion of UV lamp 94 within chamber 110 is significantly greater. The greater exposure time will enhance formation of ozone molecules and thereby enhance the concentration of ozone molecules within the oxygen bearing gas. The ozone enriched or ozonated gas exiting from chamber 110 through outlet 126 is conveyed by conduit 128 to venturi 130. Therein, the ozone enriched gas becomes entrained with the water flowing into tank 72.

By having UV lamp 94 radiate ultraviolet light at a wavelength of 254 nm (UV254), at least some of the ozone entrained within the water in water tank 72 will cause formation of hydroxyl radicals. As discussed above, the combination of UV radiation, ozone and hydroxyl radicals will convert As (III) to As (V) and oxidize at least some dissolved minerals that may be present. Thereby, variant 70 will purify the inflowing water by oxidizing organic matter, irradiating microorganisms resulting in virucidal and germicidal results and reduce the presence of arsenic [As (III)] even in the presence of sulfides and organic matter. The purified water is discharged through outlet 78 to the point of use 82.

To enhance the formation of hydroxyl radicals, hydrogen peroxide may be introduced into the water. The hydrogen peroxide may be introduced through inlet conduit 140, as represented by arrow 142. In such event, the hydrogen peroxide is introduced prior to ozonating the water to be purified. Alternatively, the hydrogen peroxide may be introduced through inlet 144, as represented by arrow 146. In this event, the hydrogen peroxide is introduced to the water containing ozone molecules. In either event, the hydrogen peroxide becomes mixed with the water in tank 72 and due to the presence of ozone will result in formation of hydroxyl radicals.

To verify that the results sought with the present invention were achieved, the following experiments were performed with variant 70 shown in FIG. 3. 24 inches of a 30 inch UV lamp 94 was located in tank 72 and 6 inches of the UV lamp extended into chamber 110. The air flow rate was 5 standard cubic feet per minute and the water flow rate was 20 liters per minute. The UV dose (mJ/cm$^2$) was calibrated and found to be approximately 48 mJ/cm$^2$ as determined by MS-2 coliphage biodosimetry.

The first experiment did not include the injection of ozone. For this experiment venturi 130 was removed. For experiments 2 and 3, the ozone dose introduced into the water yielded an initial dissolved ozone concentration of 0.2 ppm.

De-chlorinated tap water having a natural Total Organic Carbon (TOC) level of 0.2 mg/L and an arsenic level of 2 ppb (with 40% as As (III) and 60% as As (V)) was tested for Experiment 2. For Experiment 3 the TOC was adjusted with Humic acid to 2.11 mg/L TOC. MS-2 coliphage was added for Experiments 2 and 3 at an initial titer of 1.44×10$^7$ pfu/mL.

After passing the initial new and adjusted waters through variant 70, the following results were achieved:

| Experiment | System | TOC level (mg/L) | % Kill of MS-2 | % As (as As (V)) |
|---|---|---|---|---|
| 1 | UV only | 0.2 | 99.5 | 60% |
| 2 | UV/Ozone | 0.2 | 99.999 | 100% |
| 3 | UV/Ozone | 2.11 | 99.999 | 100% |

In conclusion, the results of the experiments indicate an essentially complete conversion of As (III) to As (V) even in the presence of MS-2 and TOC. It is expected that comparable results of oxidization of dissolved minerals would occur.

We claim:

1. Apparatus for converting As (III) to As (V) in water to be purified, said apparatus comprising in combination:
    a) a tank for receiving water to be purified through an inlet conduit and for discharging purified water through an outlet conduit, said tank including a lower water section under pressure and an upper air space under pressure commensurate in pressure with that present in the lower water section;
    b) a pump for conveying water from the lower water section into the upper air section;
    c) a nozzle for discharging the water from said pump into the upper air section to entrain air in the discharged water;
    d) a tube extending from the upper air section into the lower water section for directing the air entrained water from said nozzle into the lower water section and for causing turbulent flow of water in the lower water section;
    e) a UV lamp disposed in the upper air section for converting oxygen molecules in the air to ozone molecules for conveyance with the air into entrainment with the water discharged from said nozzle; and
    f) said UV lamp irradiating the water to provide a virucidal and germicidal effect on any micro organisms present in the water and for producing hydroxyl radicals in the water upon irradiation of the ozone molecules in the water, which, in combination result in conversion of As (III) that may be present to As (V).

2. The apparatus as set forth in claim 1, including a further inlet conduit for introducing hydrogen peroxide into the water to enhance production of hydroxyl radicals in the presence of UW radiation and ozone.

3. The apparatus as set forth in claim 1 wherein said UV lamp provides radiation of ultraviolet light having a wavelength of about 185 nm and a wavelength of about 254 nm.

4. The apparatus as set forth in claim 1, including a vent extending into the upper air section and having an inlet for evacuating air within the upper air section until the water level in the lower water section rises above said inlet.

5. Apparatus for converting As (III) to As (V) in water to be purified, said apparatus comprising in combination:
    a) a tank for receiving water to be purified through an inlet conduit and for discharging purified water through an outlet conduit, said tank including a lower water section under pressure and an upper air space under pressure commensurate in pressure with that present in the lower water section;
    b) a pump for conveying water from the lower water section into the upper air section;
    c) a nozzle for discharging the water from said pump into the upper air section to entrain air in the discharged water;
    d) a tube extending from the upper air section into the lower water section for directing the air entrained water from said nozzle into the lower water section and for causing turbulent flow of water in the lower water section;
    e) a UV lamp disposed in the lower water section;
    f) said tube extending into the lower water section to a point in proximity with said UV lamp to discharge air entrained water in proximity to said UV lamp;
    g) said UV lamp converting oxygen molecules in the air entrained water to ozone molecules; and
    h) said UV lamp irradiating the water to provide a virucidal and germicidal effect on any micro organisms present in the water and for producing hydroxyl radicals in the water upon irradiation of the ozone molecules in the water, which, in combination, result in conversion of As (III) that may be present to As (V).

6. The apparatus as set forth in claim 5, including further inlet conduit for introducing hydrogen peroxide into the water to enhance production of hydroxyl radicals in the presence of UV radiation and ozone.

7. The apparatus as set forth in claim 5 wherein said UV lamp provides radiation of ultraviolet light having a wavelength of about 185 nm and a wavelength of about 254 nm.

8. The apparatus as set forth in claim 5 including a shroud for enclosing said UV lamp.

9. Apparatus for converting As (III) to As (V) in water to be purified, said apparatus comprising in combination:
    a) a water tank having an inlet for receiving water to be purified and an outlet for discharging purified water;
    b) a sleeve of ultraviolet light transmissive matter disposed in said water tank;
    c) a first UV lamp disposed within said sleeve for irradiating the water surrounding said sleeve;
    d) an annular space disposed between said first UV lamp and said sleeve;
    e) a source of oxygen containing gas under pressure for conveying the gas through said annular space;
    f) said first UV lamp irradiating the gas flowing through said annular space and converting oxygen molecules into ozone molecules;
    g) a chamber having an inlet for receiving ozone enriched gas from said annular passageway and including an outlet for discharging the ozone enriched gas, said chamber having significantly greater cross sectional area than said annular space resulting in a much slower flow rate from said inlet to said outlet relative to the flow rate through said annular sleeve;
    h) a second UV lamp disposed in said chamber for converting oxygen molecules into ozone molecules at a rate greater than the rate in said annular space due to the slower flow rate of the gas; and
    i) a conduit for conveying the ozone enriched gas into the water flowing into said tank resulting in irradiation of the ozone molecules within said tank by said second UV lamp to produce hydroxyl radicals to convert As (III) that may be present to As (V).

10. The apparatus as set forth in claim 9 wherein said first and second UV lamps are embodied by a single UV lamp that extends from within said sleeve into said chamber.

11. The apparatus as set forth in claim 9, including a venturi for entraining the ozone enriched gas with the water flowing into said tank.

12. The apparatus as set forth in claim 9, including a source of hydrogen peroxide and a conduit for introducing the hydrogen peroxide into the water flowing into said tank.

13. The apparatus as set forth in claim 12 wherein said conduit for introducing hydrogen peroxide is down stream of the point of introduction of the ozone enriched gas into the water.

14. The apparatus as set forth in claim 11, including a source of hydrogen peroxide and a conduit for introducing the hydrogen peroxide into the water flowing into said tank.

15. The apparatus as set forth in claim 14 wherein said conduit for introducing hydrogen peroxide is down stream of said venturi.

16. The apparatus as set forth in claim 9 wherein the gas is air.

17. A method for converting As (III) in water to As (V), said method comprising the steps of:
   a) irradiating the water flowing into a tank with UV from a first UV lamp;
   b) conveying an oxygen containing gas through an annular space defined by the first UV lamp and a surrounding sleeve to convert oxygen molecules in the gas to ozone molecules;
   c) discharging the ozone enriched gas into a chamber;
   d) further irradiating the ozone enriched gas in the chamber with a second UV lamp to convert further oxygen molecules to ozone molecules;
   e) reducing the flow rate of the ozone enriched gas through the chamber to increase the time of exposure of the ozone enriched gas to irradiation from the second UV lamp;
   f) further conveying the ozone enriched gas from the chamber into the water flowing into the tank; and
   g) producing hydroxyl radicals in the water within the tank by irradiating the ozone with UV to convert As (III) that may be present to As (V).

18. The method as set forth in claim 17, including entraining the ozone enriched gas with the water flowing into the tank.

19. The method as set forth in claim 18 wherein said step of entraining is carried out by a venturi.

20. The method as set forth in claim 17, including the step of injecting hydrogen peroxide into the water in the tank to enhance production of hydroxyl radicals.

21. The method as set forth in claim 18 wherein said steps of irradiating with the first UV lamp and further irradiating by a second UV lamp are carried out by a common UV lamp extending from within the sleeve into the chamber.

22. Apparatus for oxidizing dissolved minerals, including iron, manganese, phosphorus and sulfur, that may be present in water to be purified, said apparatus comprising in combination:
   a) a tank for receiving water to be purified through an inlet conduit and for discharging purified water through an outlet conduit, said tank including a lower water section under pressure and an upper air space under pressure commensurate in pressure with that present in the lower water section;
   b) a pump for conveying water from the lower water section into the upper air section;
   c) a nozzle for discharging the water from said pump into the upper air section to entrain air in the discharged water;
   d) a tube extending from the upper air section into the lower water section for directing the air entrained water from said nozzle into the lower water section and for causing turbulent flow of water in the lower water section;
   e) a UV lamp disposed in the upper air section for converting oxygen molecules in the air to ozone molecules for conveyance with the air into entrainment with the water discharged from said nozzle; and
   f) said UV lamp irradiating the water to provide a virucidal and germicidal effect on any micro organisms present in the water and for producing hydroxyl radicals in the water upon irradiation of the ozone molecules in the water, which, in combination result in oxidation of at least some of the dissolved minerals that may be present.

23. The apparatus as set forth in claim 22, including a further inlet conduit for introducing hydrogen peroxide into the water to enhance production of hydroxyl radicals in the presence of UV radiation and ozone.

24. The apparatus as set forth in claim 22 wherein said UV lamp provides radiation of ultraviolet light having a wavelength of about 185 nm and a wavelength of about 254 nm.

25. The apparatus as set forth in claim 22, including a vent extending into the upper air section and having an inlet for evacuating air within the upper air section until the water level in the lower water section rises above said inlet.

26. Apparatus for oxidizing dissolved minerals, including iron, manganese, phosphorous and sulfur, that may be present in water to be purified, said apparatus comprising in combination:
   a) a tank for receiving water to be purified through an inlet conduit and for discharging purified water through an outlet conduit, said tank including a lower water section under pressure and an upper air space under pressure commensurate in pressure with that present in the lower water section;
   b) a pump for conveying water from the lower water section into the upper air section;
   c) a nozzle for discharging the water from said pump into the upper air section to entrain air in the discharged water;
   d) a tube extending from the upper air section into the lower water section for directing the air entrained water from said nozzle into the lower water section and for causing turbulent flow of water in the lower water section;
   e) a UV lamp disposed in the lower water section;
   f) said tube extending into the lower water section to a point in proximity with said UV lamp to discharge air entrained water in proximity to said UV lamp;
   g) said UV lamp converting oxygen molecules in the air entrained water to ozone molecules; and
   h) said UV lamp irradiating the water to provide a virucidal and germicidal effect on any micro organisms present in the water and for producing hydroxyl radicals in the water upon irradiation of the ozone molecules in the water, which, in combination, result in oxidation of at least some of the dissolved minerals that may be present.

27. The apparatus as set forth in claim 26, including further inlet conduit for introducing hydrogen peroxide into the water to enhance production of hydroxyl radicals in the presence of UV radiation and ozone.

28. The apparatus as set forth in claim 26 wherein said UV lamp provides radiation of ultraviolet light having a wavelength of about 185 nm and a wavelength of about 254 nm.

29. The apparatus as set forth in claim 26 including a shroud for enclosing said UV lamp.

30. Apparatus for oxidizing dissolved minerals, including iron, manganese, phosphorous and sulfur, that may be present in water to be purified, said apparatus comprising in combination:
   a) a water tank having an inlet for receiving water to be purified and an outlet for discharging purified water;
   b) a sleeve of ultraviolet light transmissive matter disposed in said water tank;
   c) a first UV lamp disposed within said sleeve for irradiating the water surrounding said sleeve;
   d) an annular space disposed between said first UV lamp and said sleeve;

e) a source of oxygen containing gas under pressure for conveying the gas through said annular space;
f) said first UV lamp irradiating the gas flowing through said annular space and converting oxygen molecules into ozone molecules;
g) a chamber having an inlet for receiving ozone enriched gas from said annular passageway and including an outlet for discharging the ozone enriched gas, said chamber having significantly greater cross sectional area than said annular space resulting in a much slower flow rate from said inlet to said outlet relative to the flow rate through said annular sleeve;
h) a second UV lamp disposed in said chamber for converting oxygen molecules into ozone molecules at a rate greater than the rate in said annular space due to the slower flow rate of the gas; and
i) a conduit for conveying the ozone enriched gas into the water flowing into said tank resulting in irradiation of the ozone molecules within said tank by said second UV lamp to produce hydroxyl radicals to oxidize at least some of the dissolved minerals that may be present.

31. The apparatus as set forth in claim 30 wherein said first and second UV lamps are embodied by a single UV lamp that extends from within said sleeve into said chamber.

32. The apparatus as set forth in claim 30, including a venturi for entraining the ozone enriched gas with the water flowing into said tank.

33. The apparatus as set forth in claim 30, including a source of hydrogen peroxide and a conduit for introducing the hydrogen peroxide into the water flowing into said tank.

34. The apparatus as set forth in claim 33 wherein said conduit for introducing hydrogen peroxide is down stream of the point of introduction of the ozone enriched gas into the water.

35. The apparatus as set forth in claim 32, including a source of hydrogen peroxide and a conduit for introducing the hydrogen peroxide into the water flowing into said tank.

36. The apparatus as set forth in claim 35 wherein said conduit for introducing hydrogen peroxide is down stream of said venturi.

37. The apparatus as set forth in claim 30 wherein the gas is air.

38. A method for oxidizing dissolved minerals, including iron, manganese, phosphorus and sulfur, that may be present, said method comprising the steps of:
a) irradiating the water flowing into a tank with UV from a first UV lamp;
b) conveying an oxygen containing gas through an annular space defined by the first UV lamp and a surrounding sleeve to convert oxygen molecules in the gas to ozone molecules;
c) discharging the ozone enriched gas into a chamber;
d) further irradiating the ozone enriched gas in the chamber with a second UV lamp to convert further oxygen molecules to ozone molecules;
e) reducing the flow rate of the ozone enriched gas through the chamber to increase the time of exposure of the ozone enriched gas to irradiation from the second UV lamp;
f) further conveying the ozone enriched gas from the chamber into the water flowing into the tank; and
g) producing hydroxyl radicals in the water within the tank by irradiating the ozone with UV to oxidize at least some of the dissolved minerals that may be present.

39. The method as set forth in claim 38, including entraining the ozone enriched gas with the water flowing into the tank.

40. The method as set forth in claim 39 wherein said step of entraining is carried out by a venturi.

41. The method as set forth in claim 38, including the step of injecting hydrogen peroxide into the water in the tank to enhance production of hydroxyl radicals.

42. The method as set forth in claim 39 wherein said steps of irradiating with the first UV lamp and further irradiating with the second UV lamp are carried out by a single UV lamp extending from within the sleeve into the chamber.

\* \* \* \* \*